(12) United States Patent
Sugama et al.

(10) Patent No.: US 10,591,690 B2
(45) Date of Patent: Mar. 17, 2020

(54) OPTICAL MODULE AND METHOD OF MANUFACTURING THE SAME

(71) Applicant: FUJITSU LIMITED, Kawasaki-shi, Kanagawa (JP)

(72) Inventors: Akio Sugama, Atsugi (JP); Naoaki Nakamura, Kawasaki (JP); Takayoshi Matsumura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/993,025

(22) Filed: May 30, 2018

(65) Prior Publication Data

US 2018/0348458 A1 Dec. 6, 2018

(30) Foreign Application Priority Data

Jun. 2, 2017 (JP) .................................. 2017-110198

(51) Int. Cl.
*G02B 6/36* (2006.01)
*G02B 6/42* (2006.01)

(52) U.S. Cl.
CPC ........... *G02B 6/4292* (2013.01); *G02B 6/428* (2013.01); *G02B 6/4256* (2013.01); *G02B 6/4261* (2013.01); *G02B 6/4284* (2013.01); *G02B 6/421* (2013.01); *G02B 6/424* (2013.01)

(58) Field of Classification Search
CPC .... G02B 6/4292; G02B 6/428; G02B 6/4256; G02B 6/421; G02B 6/424
See application file for complete search history.

(56) References Cited

U.S. PATENT DOCUMENTS

| | | | | |
|---|---|---|---|---|
| 4,798,440 A | * | 1/1989 | Hoffer | G02B 6/4246 385/88 |
| 5,071,219 A | * | 12/1991 | Yurtin | G02B 6/3878 385/78 |
| 5,268,982 A | * | 12/1993 | Schaffer | G02B 6/3879 385/56 |
| 8,057,109 B2 | * | 11/2011 | Flens | G02B 6/43 385/88 |
| 8,757,895 B2 | * | 6/2014 | Petersen | G02B 6/3817 385/78 |
| 2002/0186548 A1 | * | 12/2002 | Huang | G02B 6/4201 361/736 |
| 2014/0334783 A1 | * | 11/2014 | Megason | G02B 6/3897 385/89 |
| 2016/0309605 A1 | * | 10/2016 | Cheng | H05K 7/1418 |

FOREIGN PATENT DOCUMENTS

| | | |
|---|---|---|
| JP | 64-088406 | 4/1989 |
| JP | 09-281363 | 10/1997 |
| JP | 2013-015791 | 1/2013 |

* cited by examiner

*Primary Examiner* — Ellen E Kim
(74) *Attorney, Agent, or Firm* — Fujitsu Patent Center

(57) ABSTRACT

An optical module includes a circuit board having, an electronic circuit formed therein and an optical circuit mounted thereon, and coupled to a first end of an inner optical fiber, a connector assembly to which a second end of the inner optical fiber is fixed, and a housing including a first housing including a slid surface on which a sliding surface included in the connector assembly slides so as to position the connector assembly, a second housing including an engaging protrusion engaged with the positioned connector assembly so as to fix the connector assembly, the second housing being bonded to the first housing and the housing being mounted with the circuit board.

8 Claims, 14 Drawing Sheets

FIRST END SIDE

SECOND END SIDE

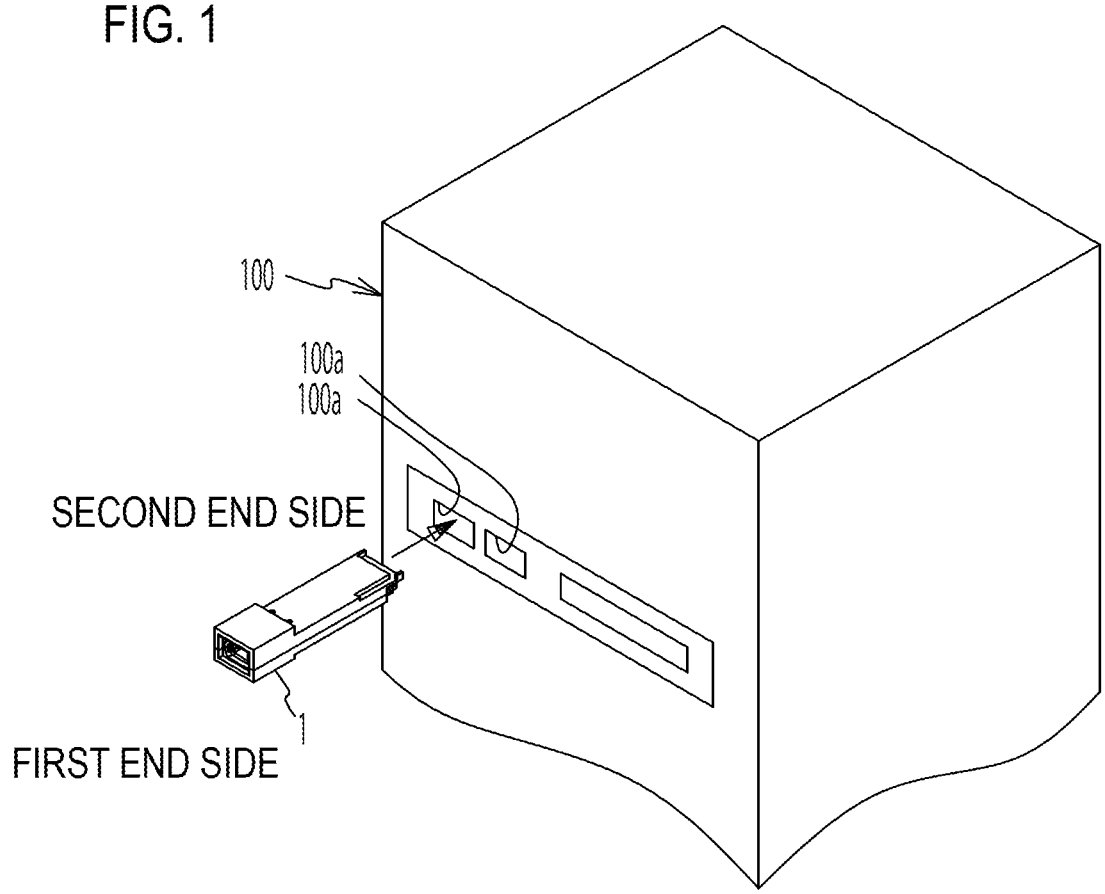

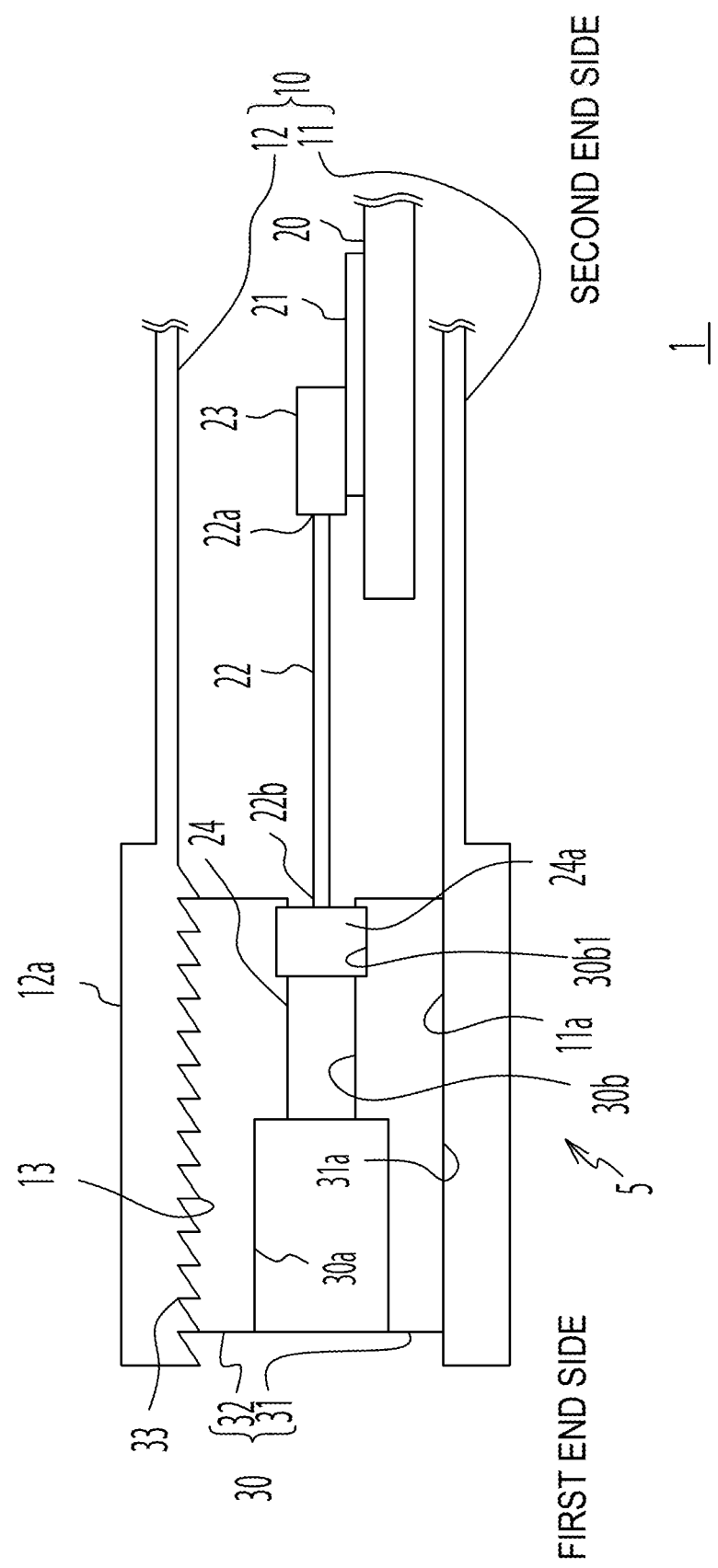

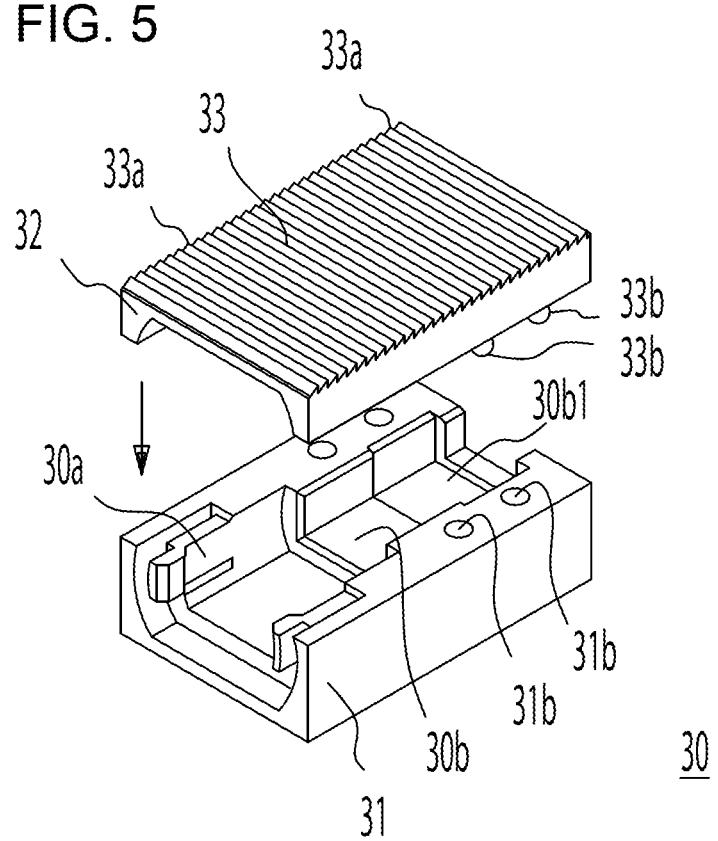

OPTICAL MODULE AND METHOD OF MANUFACTURING THE SAME

CROSS-REFERENCE TO RELATED APPLICATION

This application is based upon and claims the benefit of priority of the prior Japanese Patent Application No. 2017-110198, filed on Jun. 2, 2017, the entire contents of which are incorporated herein by reference.

FIELD

The embodiments discussed herein are related to an optical module and manufacturing method of the optical module.

BACKGROUND

In the related art, various devices, connectors, or the like using optical fibers have been proposed. For example, it has been proposed to cover a container of an optical semiconductor module, to which an optical fiber is coupled at one end, with a resin mold (see Japanese Laid-Open Patent Publication No. 09-281363). In addition, an optical connector provided with a positioning protrusion which locally elastically deforms an outer peripheral portion of a coating of an inserted fiber has been proposed (see Japanese Laid-Open Patent Publication No. 2013-015791). Further, there is known an optical connector plug which is provided with a fixing key body having opposed inner surfaces each having a wave form shape for fixing an optical fiber by sandwiching therebetween a protective coating portion of an optical fiber inserted into a connector plug body. This optical connector plug is provided with a concave portion and a convex portion that are engaged with each other in the connector plug body and the fixing key body to perform a locking operation (see Japanese Laid-Open Patent Publication No. 64-088406).

Related technologies are disclosed in, for example, Japanese Laid-Open Patent Publication Nos. 09-281363, 2013-015791, and 64-088406.

SUMMARY

According to an aspect of the embodiments, an optical module includes a circuit board having an electronic circuit formed therein and an optical circuit mounted thereon and coupled to a first end of an inner optical fiber, a connector assembly to which a second end of the inner optical fiber is fixed, and a housing including a first housing including a slid surface on which a sliding surface included in the connector assembly slides so as to position the connector assembly and a second housing including an engaging protrusion engaged with the positioned connector assembly so as to fix the connector assembly, the second housing being bonded to the first housing and the housing being mounted with the circuit board.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is an explanatory view illustrating how an optical transceiver of a first embodiment is inserted into a slot provided in a server;

FIG. 2 is an explanatory view illustrating the inside of the optical transceiver of the first embodiment;

FIG. 5 is an exploded perspective view illustrating a connector assembly included in the optical transceiver of the first embodiment;

DESCRIPTION OF EMBODIMENTS

Figure 3A:
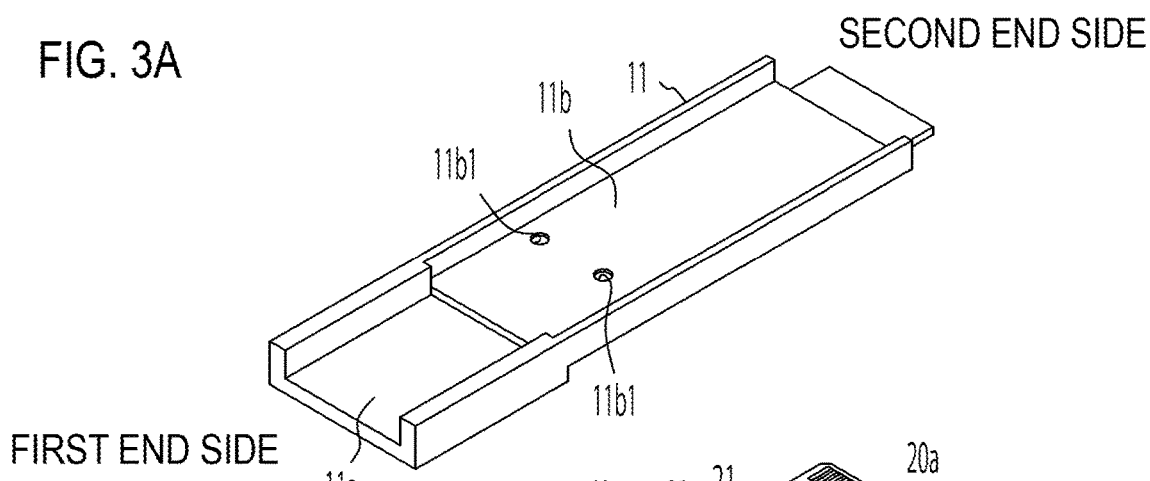
FIGS. 3A to 3C are explanatory views illustrating a part of the manufacturing process of the optical transceiver of the first embodiment.

Meanwhile, due to the progress of recent silicon photonics technology, optical modules capable of high speed-high capacity communication, for example, optical transceivers, and the like have appeared. Silicon photonics forms a micro optical circuit on a silicon chip, and such an optical circuit is mounted on a circuit board. Since a connecting portion in which a connector provided with an external optical fiber cable or the like is fitted to an optical transceiver is disposed on a first end side of the optical transceiver, a short optical wiring is required for connecting an optical circuit and the connecting portion to each other. As such an optical wiring, it is conceivable to adopt a polymer optical wave guide or an inner optical fiber.

A film-shaped polymer optical wave guide having film shape has high bending flexibility and is suitable for a short wiring for a narrow region. However, when the film-shaped polymer optical wave guide is applied to silicon photonics in which a single mode with a wavelength of 1.3 μm to 1.55 μm is mainly used, a special material such as fluoride resin is required. In addition, a polymer optical wave guide connector to be coupled to an external optical fiber has not been put to practical use, and it is difficult to adopt the polymer optical wave guide.

On the other hand, the inner optical fiber has low loss and enables selection of various types of connectors, so that the inner optical fiber may be conveniently used and adopted in a short optical wiring connecting an optical circuit and a connecting portion to each other.

However, when adopting a bendable optical fiber as an inner optical fiber in a short optical wiring connecting an optical circuit and a connecting portion, it is assumed that the following problems will arises.

In the case where an inner optical fiber is adopted in an optical wiring, when a length of the inner optical fiber is shorter than a distance between an optical circuit and a connecting portion, the inner optical fiber is not able to connect the optical circuit and the connecting portion to each other. In addition, the length of an optical fiber has variations in manufacturing. For this reason, considering a margin of length, an optical fiber having a slightly longer length is arranged between an optical circuit and a connecting portion. As a result, the inner optical fiber is in a bent state. The inner optical fiber in a bent state stores spring force which tends to return to its original state. As an optical fiber, a material that is difficult to bend such as a glass-based material is often used, and stores strong spring force when the optical fiber is in the bent state. In recent years, an optical fiber with a low bending loss has also appeared, but the optical fiber also stores spring force when it is bent.

It is considered that the spring force stored in the inner optical fiber not only imposes load on the inner optical fiber itself, but also affects, especially the bonding of the inner optical fiber to an optical circuit. The inner optical fiber is bonded to the optical circuit using, for example, an adhesive. However, there is a possibility that the spring force stored in the inner optical fiber deforms the adhesive due to creep. Since bonding between the inner optical fiber and the optical circuit is required to be highly accurate, even with slight deformation of the adhesive, the performance of the optical module deteriorates and thus degrades reliability thereof.

Hereinafter, embodiments of the present disclosure will be described with reference to the accompanying drawings. However, in the drawings, sizes, ratios, and the like of the respective portions may be illustrated without completely matching the actual ones. Also, in some drawings, for the convenience of explanation, actually existing components may be omitted or dimensions may be exaggerated.

First Embodiment

Figure 6:
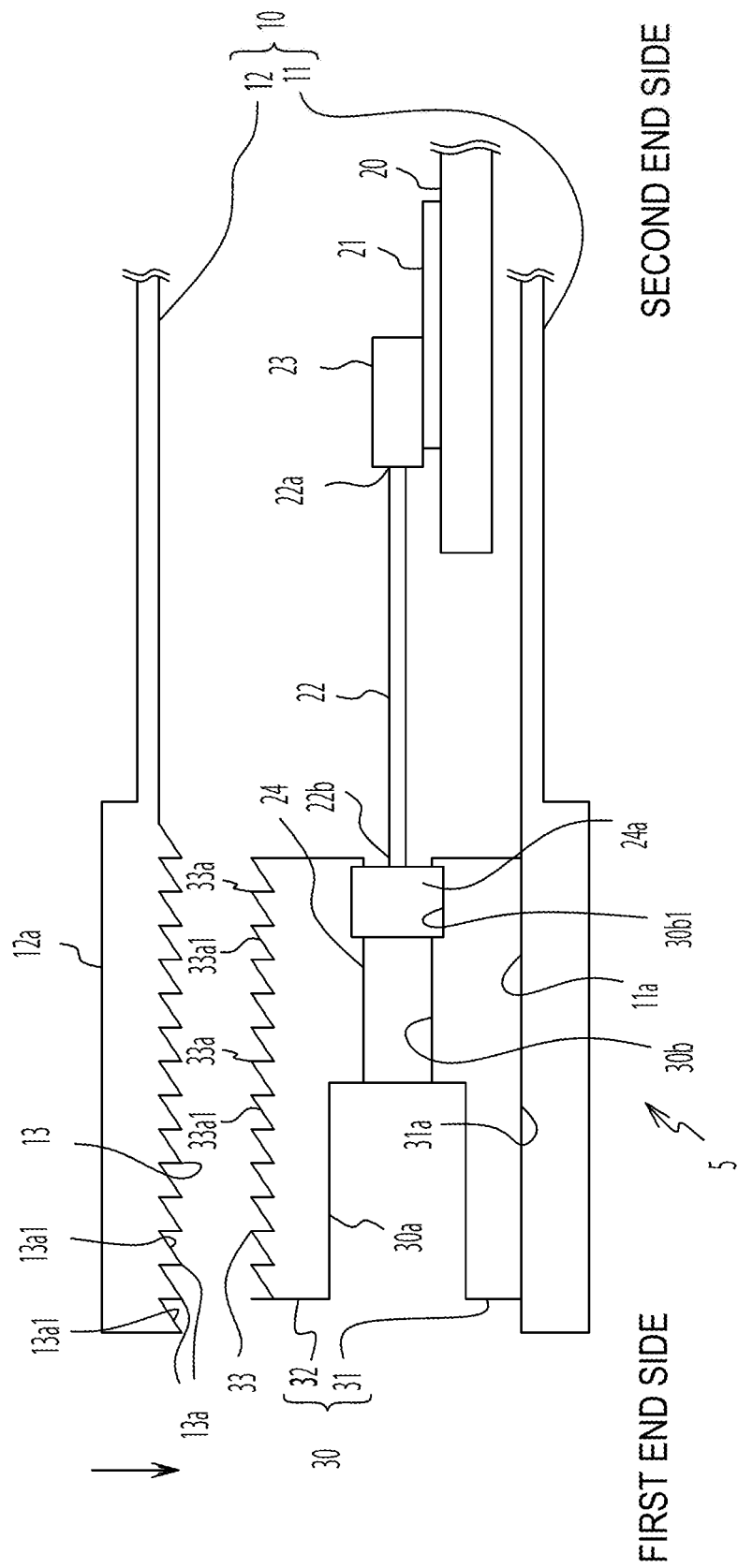
FIG. 6 is an explanatory view illustrating how a second housing included in the optical transceiver of the first embodiment is mounted.
Figure 7:
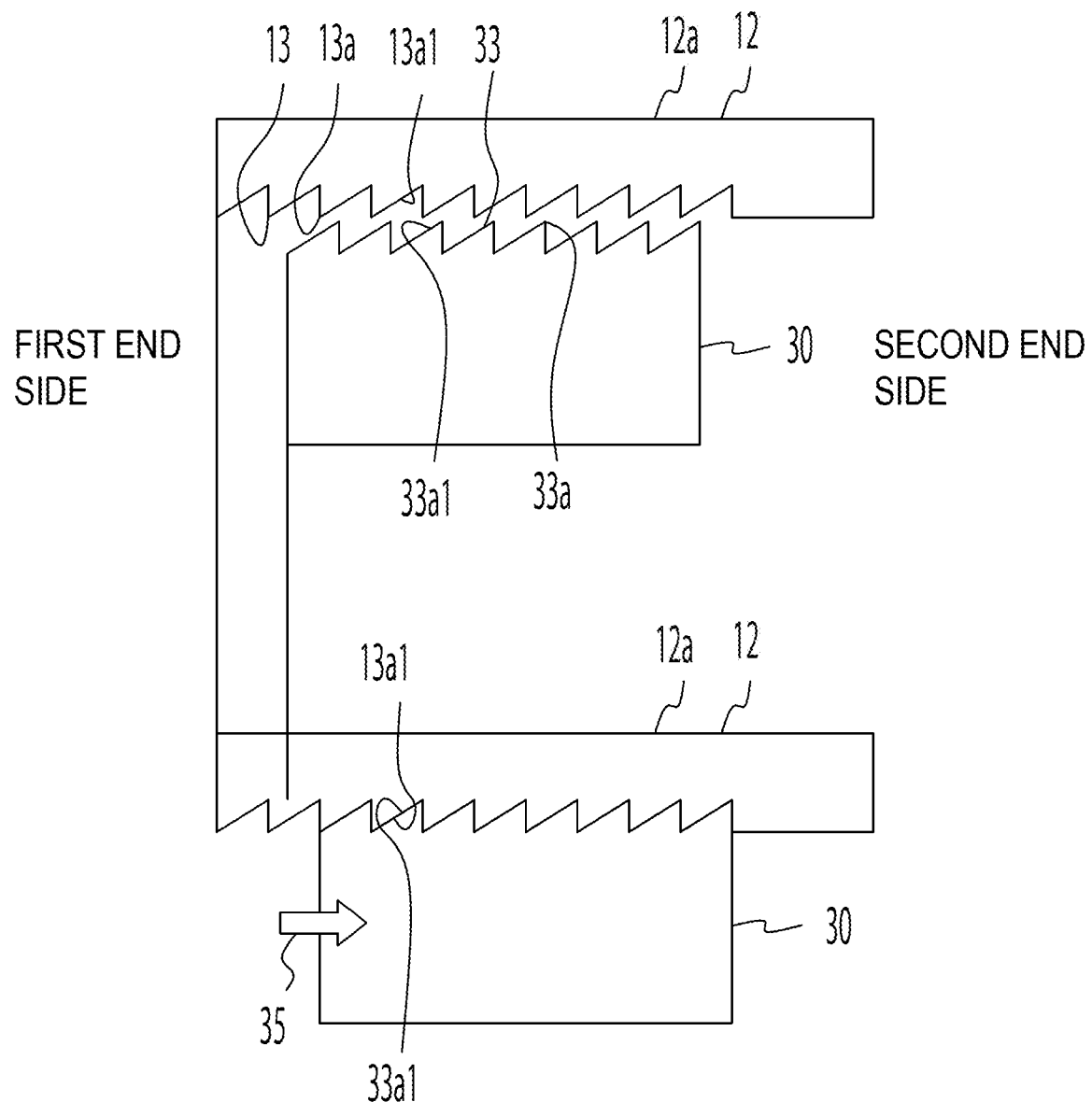
FIG. 7 is an explanatory view schematically illustrating how engaging portions provided in the second housing included in the optical transceiver of the first embodiment is engaged with engaged portions provided in the connector assembly.

Firstly, with reference to the FIGS. 1 to 7, an optical transceiver 1 of the first embodiment is described. FIG. 1 is an explanatory view illustrating how the optical transceiver of the first embodiment is inserted into a slot provided in a server. FIG. 2 is an explanatory view illustrating the inside of the optical transceiver of the first embodiment. FIGS. 3A to 3C are explanatory views illustrating a part of the manufacturing process of the optical transceiver of the first embodiment. FIGS. 4A and 4B are explanatory views illustrating a part of the manufacturing process of the optical transceiver of the first embodiment. FIG. 5 is an exploded perspective view illustrating a connector assembly included in the optical transceiver of the first embodiment. FIG. 6 is an explanatory view illustrating how the second housing included in the optical transceiver of the first embodiment is mounted. FIG. 7 is an explanatory view schematically illustrating how an engaging portion provided in the second housing included in the optical transceiver of the first embodiment is engaged with an engaged portion provided in the connector assembly. In the following description, it is assumed that a first end side and a second end side of an optical transceiver 1 or an optical connector 5 are set as illustrated in FIG. 1 or FIG. 2.

The optical transceiver 1 according to the present embodiment is an example of an optical module and is used by being inserted into a slot 100a included in a server 100, for example, as illustrated in FIG. 1. Referring to FIG. 2, the optical transceiver 1 is provided with an optical connector 5 and a circuit board 20 coupled to the optical connector 5 through an inner optical fiber 22. The optical transceiver 1 is provided with the circuit board 20 at the second end side, and the circuit board 20 is inserted into the slot 100a. Then, the first end side of the optical transceiver 1, i.e. the first end side of the optical connector 5 is configured to be coupled to another connector.

The optical connector 5 is provided with a housing 10 in which a first housing 11 and a second housing 12 are bonded to each other. The housing 10 is a case that is an exterior portion of the optical connector 5. Further, the optical connector 5 is provided with a connector assembly 30 provided in the housing 10. The connector assembly 30 is provided with a fitting portion 30a into which another connector is fitted and functions as, for example, an adapter to which another connector provided with an external optical fiber is coupled. Moreover, in this specification, the expression "external optical fiber" is used to distinguish it from the inner optical fiber 22 included in the optical transceiver 1. The external optical fiber is an optical fiber coupled with the inner optical fiber 22 via the optical connector 5.

On the circuit board 20 coupled to the optical connector 5, an optical circuit 21 having an electronic circuit formed therein is mounted. A first end 22a of the inner optical fiber 22 is fixed to the optical circuit 21 via an optical fiber array 23. The optical fiber array 23 is bonded to the optical circuit 21 via an adhesive. A second end 22b of the inner optical fiber 22 is fixed to a mechanical transfer (MT) ferrule 24. The MT ferrule 24 is fixed to the connector assembly 30. That is, the second end 22b of the inner optical fiber 22 is fixed to the connector assembly 30 via the MT ferrule 24. The MT ferrule 24 is provided in a fixing portion 30b of the connector assembly 30. At this time, a convex shape portion 24a provided on the MT ferrule 24 is fitted into a concave shape portion 30b1 provided in the fixing portion 30b, whereby the MT ferrule 24 is positioned and fixed with respect to the connector assembly 30.

Figure 3B:
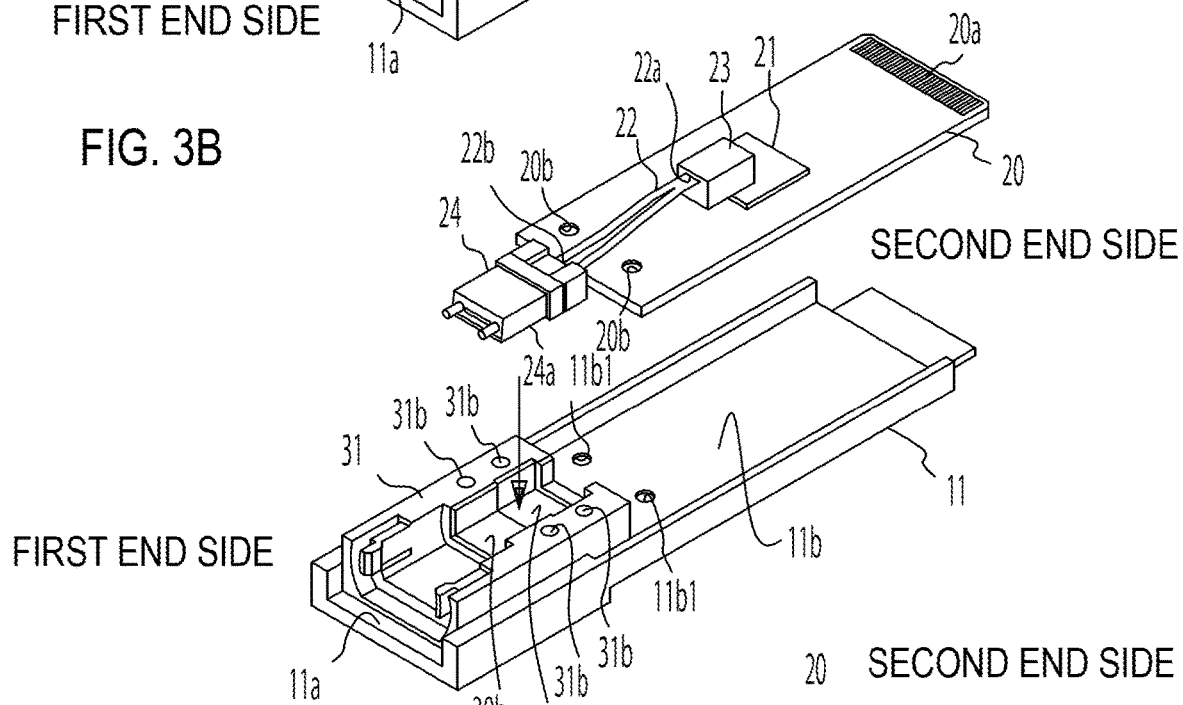

Referring to FIG. 3B and the like, an electrode portion 20a is provided on a second end side of the circuit board. The electrode portion 20a comes into contact with a terminal provided in the slot 100a when the optical transceiver 1 is inserted into the slot 100a. Fixing screw holes 20b are provided in the circuit board 2.

Both the first housing 11 and the second housing 12 forming the housing 10 are manufactured by die casting. When facing and bonded to each other, the first housing 11 and the second housing 12 form space in which the circuit board 20 is mounted and the connector assembly 30 may be built.

The first housing 11 is provided with a slid surface 11a on which a sliding surface 31a included in the connector assembly 30 slides to position the connector assembly 30. The slid surface 11a in this embodiment is a smooth surface. In a manufacturing process of the optical transceiver 1, the slid surface 11a in this embodiment may cause the connector assembly 30, to which the second end 22b of the inner optical fiber 22 is fixed, to be slid to perform the positioning of the connector assembly 30. The positioning of the connector assembly 30 will be described in detail later. As illustrated in FIG. 3A, a circuit board mounting area 11b is formed at the second end side in the first housing 11 in a shape corresponding to the outer peripheral shape of the circuit board 20. Further, the circuit board mounting area 11b is provided with screw holes 11b1. The screw holes 11b1 are used for bonding and fixing the first housing 11 and the second housing 12.

The second housing 12 is provided with a top plate portion 12a on the first end side and an engaging portion 13 inside the top plate portion. The engaging portion 13 is provided with an engaging protrusion 13a. In the present embodiment, a plurality of engaging protrusions 13a is provided. As described in detail later, the optical connector 5 in the present embodiment is able to suppress spring force from being generated in the inner optical fiber 22 as much as possible, even when the natural length of the inner optical fiber 22 is different. By providing the engaging portion 13 in a wide range and increasing the number of the engaging protrusions 13a, it is possible to cope with the variations of the natural length of the inner optical fiber 22 in a great extent.

In a manufacturing process of the optical transceiver 1, the engaging protrusions 13a are engaged with engaged protrusions 33a provided on the engaged portion 33 included in the connector assembly 30 positioned on the first housing 11 to fix the connector assembly 30.

The engaging protrusions 13a of the present embodiment are consecutively provided from the first end side towards the second end side of the first housing 11 and form the sawtooth-shaped engaging portion 13. That is, each of the engaging protrusions 13a has a triangle shape. Each of the engaging protrusions 13a of the present embodiment includes an inclined surface 13a1 on a side corresponding to a second end side of the housing 10. Then, each of the engaged protrusions 33a on the connector assembly 30 side, which are engaged with the engaging protrusions 13a has a triangle shape including an inclined surface 33a1 that is in close contact with the inclined surface 13a1. The inclined surface 33a1 is provided on a side corresponding to the first end side of the housing 10 of the engaged protrusion 33a so as to be in close contact with the inclined surface 13a1. In the present embodiment, the interval between the engaging protrusions 13a and the interval between the engaged protrusions 33a are set to be the same.

By including the inclined surface 13a1, the engaging protrusion 13a has an acute angle at the apex. By including the inclined surface 33a1, the engaged protrusion 33a on one side also has an acute angle at the apex. Accordingly, when the first housing 11 is covered on and fixed to the connector assembly 30, the connector assembly 30 and the first housing 11 may be engaged with each other irrespective of the position of the connector assembly 30 on the slid surface 11a. When the shape of the engaging protrusion or the engaged protrusion has a shape having a top surface, such as a rectangle shape or a trapezoidal shape, the engaging protrusion and the engaged protrusion may not be engaged with each other when the connector assembly 30 is located at a position where the top faces are collided with each other. As a result, the connector assembly 30 may not be properly fixed. According to the present embodiment, it is possible to avoid such a situation.

The second housing 12 is provided with screw holes 12b. The screw holes 12b are used for bonding the second housing 12 and the first housing 11 to each other.

Referring to FIG. 5, the connector assembly 30 is provided with a first member 31 and a second member 32, which are configured to be vertically separable from each other. Through the vertical separation, the installation of the MT ferrule 24 is facilitated. The sliding surface 31a is provided on the first member 31 side, and the engaged portion 33 including the engaged protrusion 33a is provided in the second member 32. The fixing portion 30b and the concave shape portion 30b1 of the MT ferrule 24 are provided in the first member 31. The first member 31 is provided with bonding holes 31b, and the second member 32 is provided with bonding pins 33b. By inserting the bonding pins 33b into the bonding holes 31b, it is possible to join the first member 31 and the second member 32 and to form the connector assembly 30. Further, both of the first member 31 and the second member 32 are resin-molded products.

The optical connector 5 may perform the positioning of the connector assembly 30 by including the slid surface 11a and the sliding surface 31a, and may fix the positioned connector assembly 30 by including the engaging protrusions 13a. Therefore, the optical connector 5 may be suitably used for the optical module such as the optical transceiver 1 of the present embodiment.

Figure 3C:
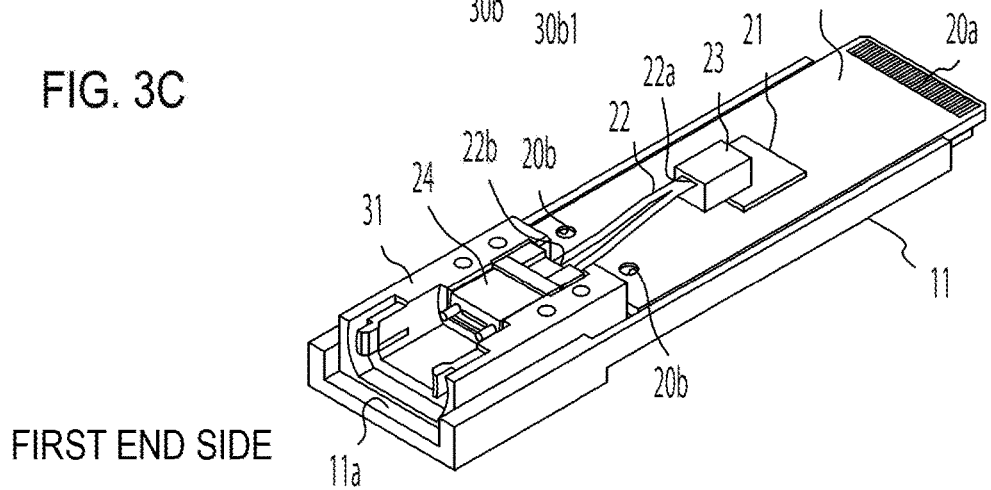

Next, an example of a manufacturing method of the optical transceiver 1 will be described with reference mainly to FIGS. 3A to 4B. Firstly, as illustrated in FIG. 3A, the first housing 11 is placed on the work table so that the slid surface 11a faces upward. Then, as illustrated in FIG. 3B, the first member 31 of the connector assembly 30 is placed on the slid surface 11a. Then, as illustrated in FIG. 3C, the circuit board 20 is mounted on the mounting area 11b, and the MT ferrule 24 is placed on the fixing portion 30b included in the first member 31.

At this time, the optical circuit 21 is mounted on the circuit board 20 in advance, and the first end 22a of the inner optical fiber 22 is fixed to the optical circuit 21. Further, the MT ferrule 24 is mounted in the second end 22b of the inner optical fiber 22. Here, the inner optical fiber 22 is made to have a margin in its length. Here, what is assumed as the shortest length of the inner optical fiber 22 is the length that is set based on the interval between the optical circuit 21 and the MT ferrule 24 in the state in which the circuit board 2 is positioned on the circuit board mounting area 11b and the connector assembly 30 is provided at the position close to the circuit board mounting area 11b of the slid surface 11a. The inner optical fiber 22 is processed to be longer than this shortest length. Therefore, when the circuit board is mounted on the circuit board mounting area 11b and the MT ferrule 24 is mounted on the fixing portion 30b, the connector assembly 30, which is in a state in which the convex shape portion 24a of the MT ferrule 24 is engaged with the concave shape portion 30b1, is positioned. That is, since the inner optical fiber 22 has a longer length than the shortest length, the connector assembly 30 is positioned to a position which is spaced away from the circuit board mounting area 11b according to the natural length of the inner optical fiber 22. Even if the inner optical fiber 22 is bent, the inner optical fiber 22 tends to return to its natural length. The inner optical fiber having the natural length does not store the spring force.

It is assumed that the inner optical fiber 22 is somewhat different in length due to tolerance and the like. However, the connector assembly 30 is positioned to a position according to the natural length of the inner optical fiber 22 since it is movable on the slid surface 11a.

In this manner, the connector assembly 30 is positioned according to the natural length of the inner optical fiber 22.

Figure 4A:
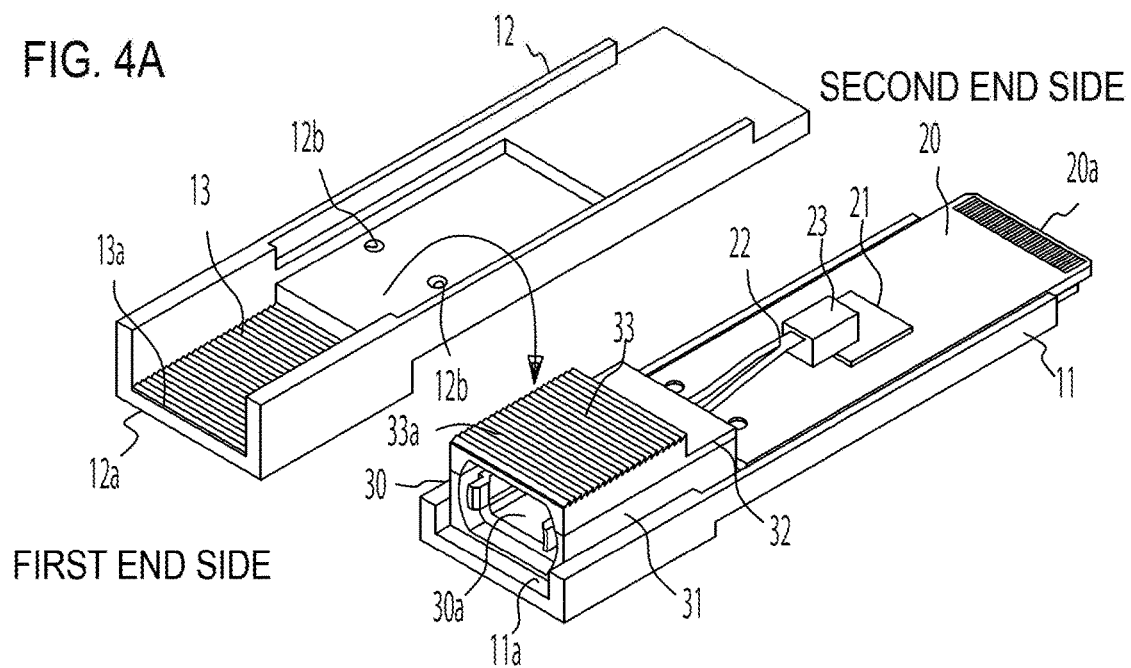
FIGS. 4A and 4B are explanatory views illustrating a part of the manufacturing process of the optical transceiver of the first embodiment.

Next, as illustrated in FIG. 4A, the second member 32 is bonded to the first member 31, and subsequently, as illustrated in FIG. 6, the circuit board 20 and the connector assembly 30 is covered with the second housing 12 such that the engaging portion 13 and the engaged portion 33 face each other.

Here, referring to FIG. 7, the engaging protrusions 13a of the present embodiment includes an inclined surface 13a1 on a side corresponding to the second end side of the housing 10. Then, each of the engaged protrusions 33a on the connector assembly 30 side, which are engaged with the engaging protrusions 13a has a triangle shape including an inclined surface 33a1 to be in close contact with the inclined surface 13a1. Therefore, when the engaging protrusions 13a and the engaged protrusions 33a are totally engaged with each other, the connector assembly 30 may be moved in the direction indicated by an arrow 35, that is, to the second end side of the housing. As a result, the inner optical fiber 22 is slightly shortened from the natural length, but the amount of movement of the connector assembly 30 is within the interval of the engaging protrusion 13a, so that no excessive spring force is generated.

According to the present embodiment, even when the natural length is different due to the variation in the natural length of the inner optical fiber 22, it is possible to fix the connector assembly 30 in a state in which the inner optical fiber 22 is slightly shortened from the natural length. When it is impossible to position the connector assembly 30, the amount to be bent and thus shortened increases as the length of the inner optical fiber 22 increases, so that the spring force generated in the inner optical fiber 22 increases. According to the present embodiment, it is possible to avoid such a situation.

Figure 4B:
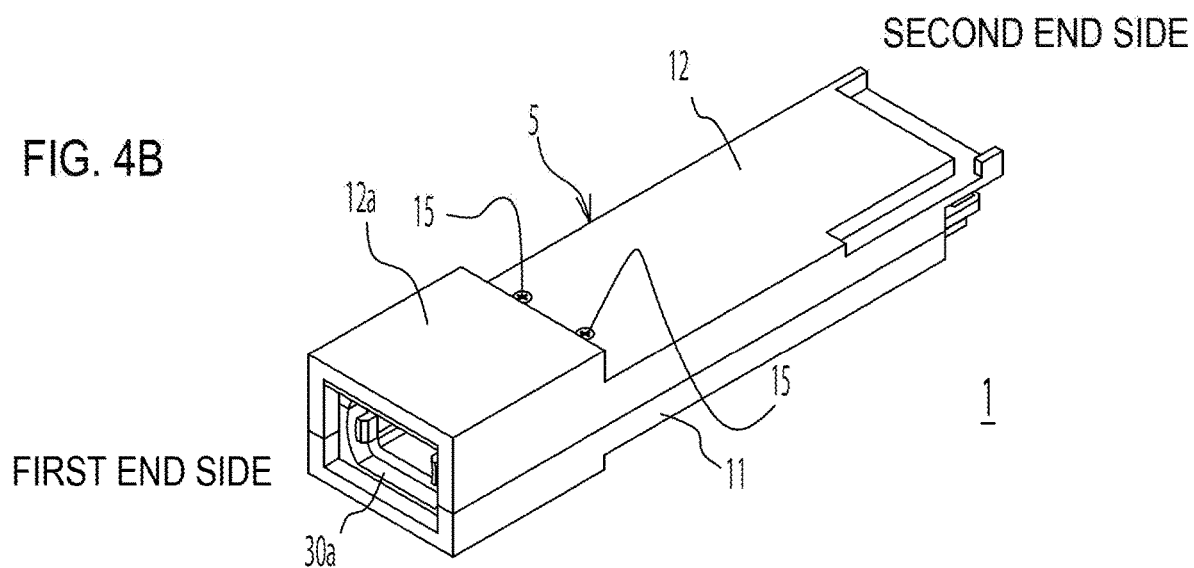

After the engaging protrusion 13a and the engaged protrusion 33a are engaged with each other, the optical transceiver 1 is completed by bonding and fixing the first housing 11 and the second housing 12 to each other using the screws 15, as illustrated in FIG. 4B. The screws 15 inserted into the screw holes 12b provided in the second housing 12 reach the screw holes 11b1 provided in the first housing 11 through the screw holes 20b provided in the circuit board 20, and are fastened.

Thus, according to the present embodiment, since the connector assembly 30 is positioned and fixed according to the natural length of the inner optical fiber 22, the spring force is not stored in the inner optical fiber 22. As a result, deformation of the adhesive used for bonding the optical circuit 21 and the optical fiber array 23 is suppressed.

Modified Example

Figure 8:
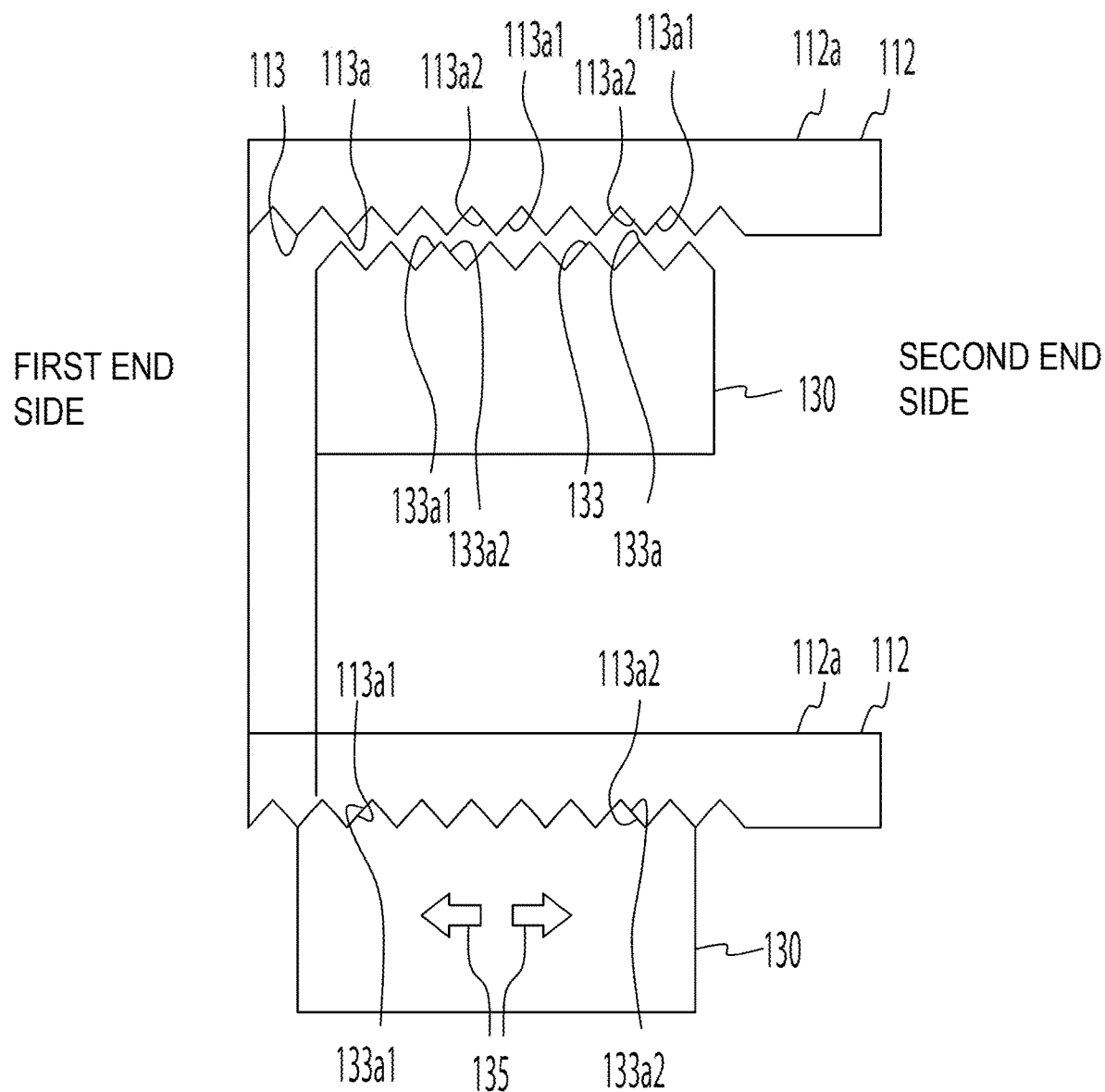
FIG. 8 is an explanatory view schematically illustrating how engaging protrusion and engaged protrusions of a modified example are engaged with each other.
Figure 9:
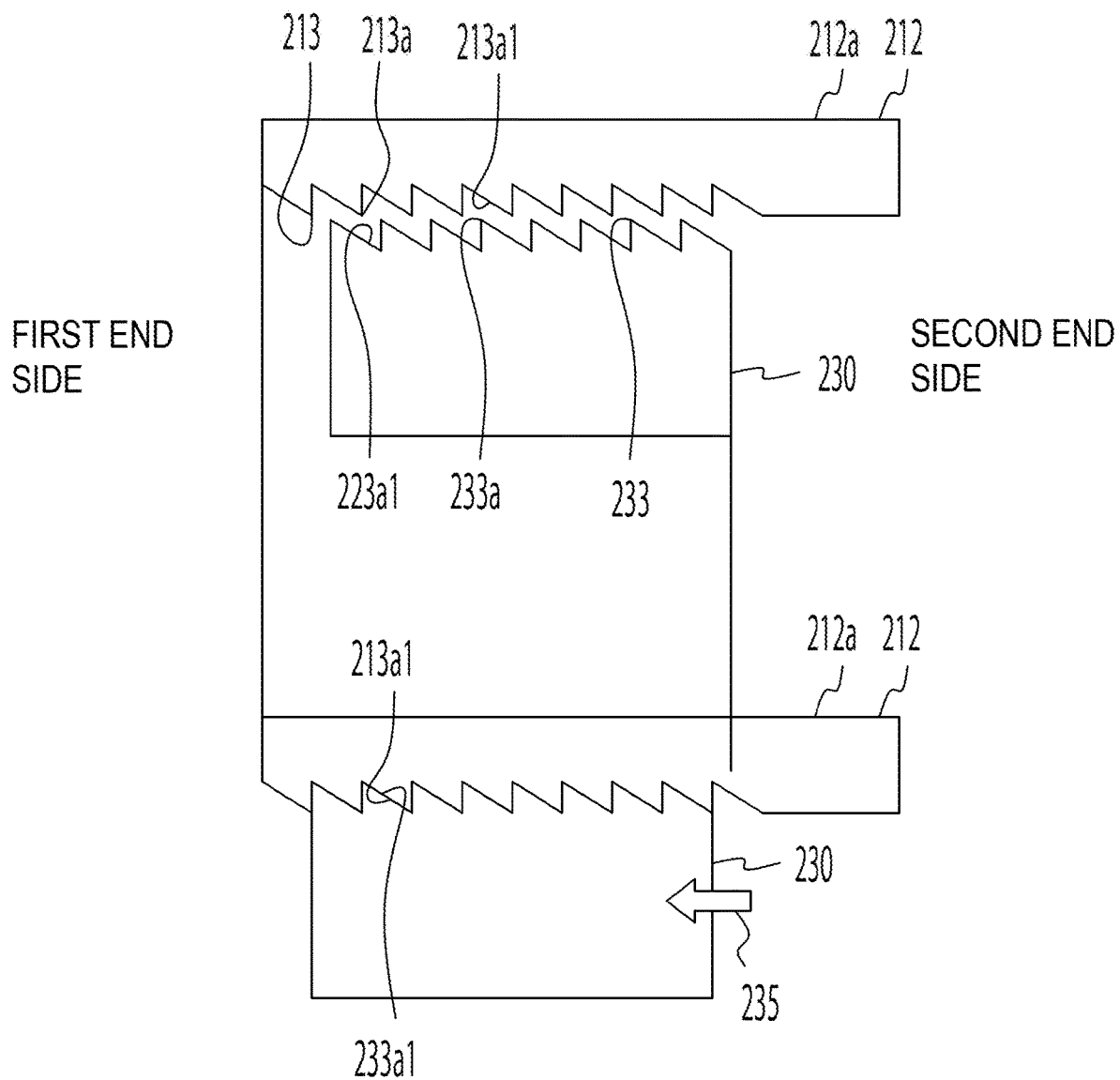
FIG. 9 is an explanatory view schematically illustrating how engaging protrusions and engaged protrusions of another modified example are engaged with each other.

Here, a modified example will be described with reference to FIGS. 8 and 9. FIG. 8 is an explanatory view schematically illustrating how engaging protrusions and engaged protrusions of a modified example are engaged with each other. FIG. 9 is an explanatory view schematically illustrating how engaging protrusions and engaged protrusions of another modified example are engaged with each other.

Each of the engaging protrusion included in the second housing 12 may have an inclined surface on at least one of a side corresponding to the first end side of the housing and the side corresponding to the second end side of the housing. Further, a connector assembly may be provided with engaged protrusions each including an inclined surface to be in close contact with the inclined surface included in each engaging protrusion.

A second housing 112 of the modified example illustrated in FIG. 8 is provided with an engaging portion 113 on a top plate portion 112a. The engaging portion 113 is provided with engaging protrusions 113a each including an inclined surface 113a1 on a side corresponding to the second end side of the housing and an inclined surface 113a2 on a side corresponding to the first end side of the housing. Correspondingly, a connector assembly 130 is provided with an engaged portion 133. The engaged portion 133 is provided with engaged protrusions 133a each including an inclined surface 133a1 which may be in close contact with the inclined surface 113a1 and an inclined surface 133a2 which may be in close contact with the inclined surface 113a2.

In the case where the engaging protrusions 113a are shaped as described above, when the second housing 112 is covered on the connector assembly 130 positioned according to the natural length of the inner optical fiber 22, the maximum amount of movement of the connector assembly 130 is within half the interval of the engaging protrusions 113a. That is, the maximum amount of movement of the connector assembly 130 is reduced. However, as represented by arrows 135 in FIG. 8, the connector assembly 130 may be moved toward the first end side or moved toward the second end side of the housing.

A second housing 212 of the modified example illustrated in FIG. 9 is provided with an engaging portion 213 on a top plate portion 212a. The engaging portion 213 is provided with engaging protrusions 213a each including an inclined surface 213a1 on a side corresponding to the first end side of the housing. Correspondingly, a connector assembly 230 is provided with an engaged portion 233. The engaged portion 233 is provided with engaged protrusions 233a each including an inclined surface 233a1 which may be in close contact with the inclined surface 213a1.

In the case where the engaging protrusions 113a are shaped as described above, when the second housing 212 is covered on the connector assembly 230 positioned according to the natural length of the inner optical fiber 22, the connector assembly 230 is moved toward the first end side of the housing as represented by an arrow 235 in FIG. 9. The maximum amount of movement is within the interval of the engaging protrusions 213a.

In this manner, the shape of the engaging protrusions may be changed variously, and may be properly selected depending on design conditions and applications.

Second Embodiment

Figure 10A:
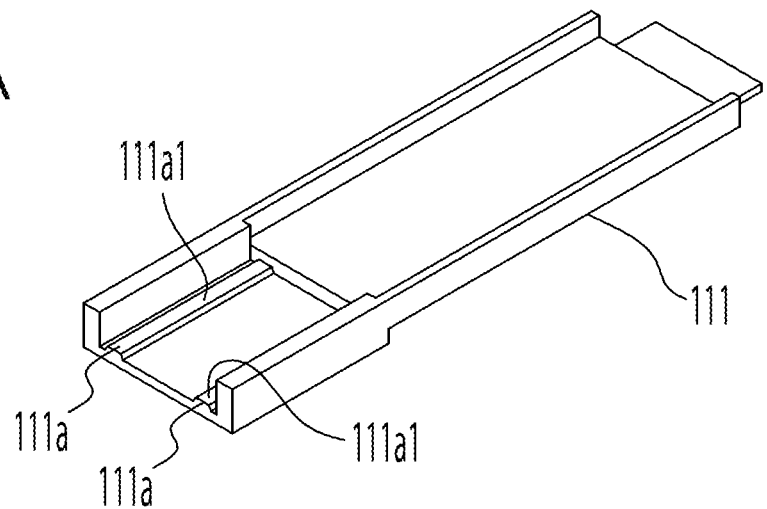
FIG. 10A is a perspective view of a first housing of a second embodiment.

Next, a second embodiment will be described with reference to FIGS. 10A and 10B. FIG. 10A is a perspective view of the first housing of the second embodiment, and FIG. 10B is a perspective view of a connector assembly of a modified example.

Referring to FIG. 10A, a first housing 111 is provided with rail portions 111a in a region of the first end side of the housing. The rail portions 111a extend from the first end side toward the second end side of the housing. The surfaces of the rail portions 111a are formed as slid surfaces 111a1. Such slid surfaces 111a1 have a small area compared with the slid surface 11a in the first embodiment. Therefore, it is possible to reduce the contact area with the connector assembly. This facilitates the sliding of the connector assembly, so that the connector assembly is easily moved to a position according to the natural length of the inner optical fiber 22.

Figure 10B:
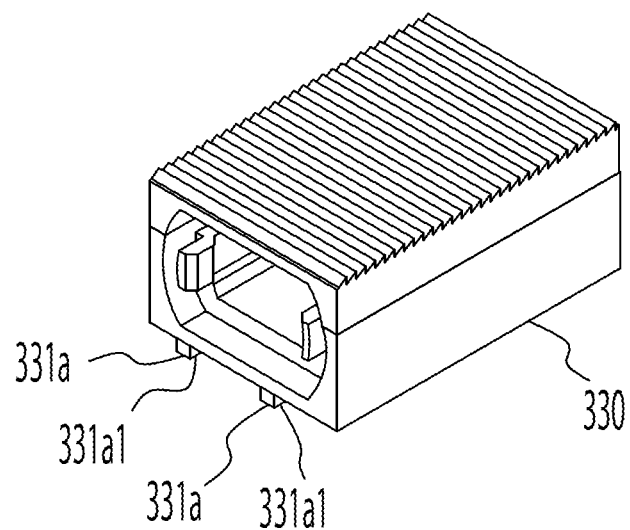
FIG. 10B is a perspective view of a connector assembly of a modified example.

As in a connector assembly 330 illustrated in FIG. 10B, rail portions 331a may be provided on a surface facing the first housing, and the surfaces of the rail portions 331 may be formed as sliding surfaces 331a1. In this case as well, since the contact area between the first housing 111 and the connector assembly 330 is reduced, the connector assembly 330 is easily moved to a position according to the natural length of the inner optical fiber 22.

Third Embodiment

Figure 11A:
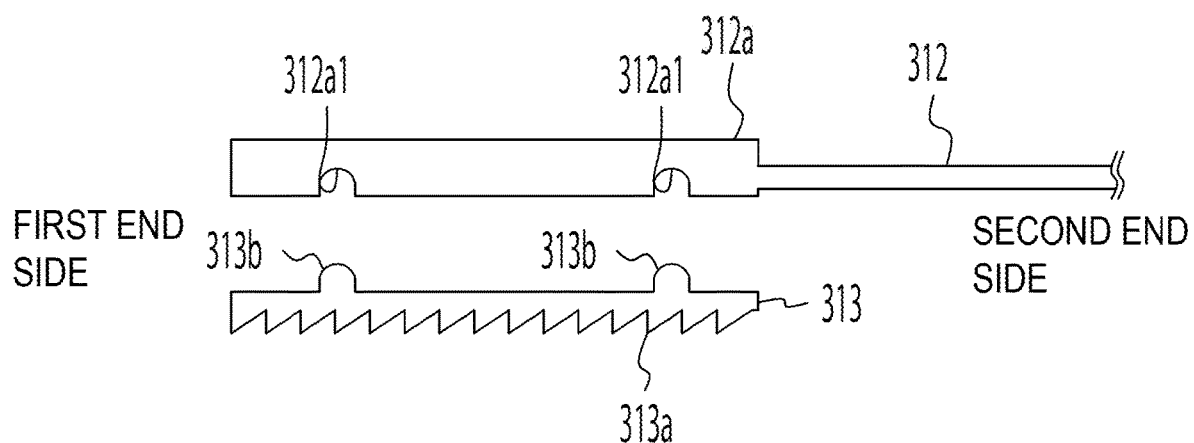
FIG. 11A is an explanatory view illustrating a state in which an engaging portion of a third embodiment is separated from a top plate portion.
Figure 11B:
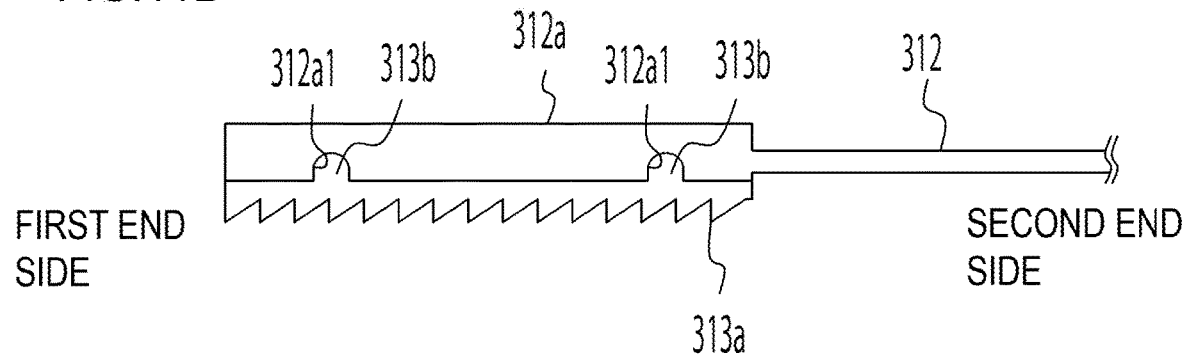
FIG. 11B is an explanatory view illustrating a state in which the engaging portion of the third embodiment is mounted on the top plate portion.

Next, a third embodiment will be described with reference to FIGS. 11A and 11B. FIG. 11A is an explanatory view illustrating a state in which an engaging portion of the third embodiment is separated from a top plate portion, and FIG. 11B is an explanatory view illustrating a state in which the engaging portion of the third embodiment is mounted on the top plate portion.

Referring to FIG. 11A, engaging protrusions 313a are provided separately from a top plate portion 312a included in a second housing 312. The engaging protrusions 313a are provided in an engaging portion 313 which is provided separately from the top plate portion 312a. The engaging portion 313 is provided with mounting protrusions 313b, and, as illustrated in FIG. 11B, as the mounting protrusions 313b are fitted into mounting holes 312a1 provided in the top plate portion 312a, the engaging portion 313 and the top plate portion 312a may be integrated. Here, the second housing 312 is manufactured by die casting and the engaging portion 313 is a resin-molded product.

The interval of the engaging protrusions affects the maximum amount of movement of the connector assembly from a position corresponding the natural length of the inner optical fiber 22. That is, the narrower the interval of the engaging protrusions, the maximum amount of movement of the connector assembly may be reduced. Here, when comparing die casting and resin molding, the resin molding is more suitable for reproducing micro shapes. Therefore, by producing the engaging portion 313 as a resin-molded product, it is possible to finely set the interval of the engaging protrusions 313a. On the other hand, by manufacturing the second housing 312 using the die casting, it is possible to secure the strength of the optical connector 5 and the optical transceiver.

Fourth Embodiment

Figure 12:
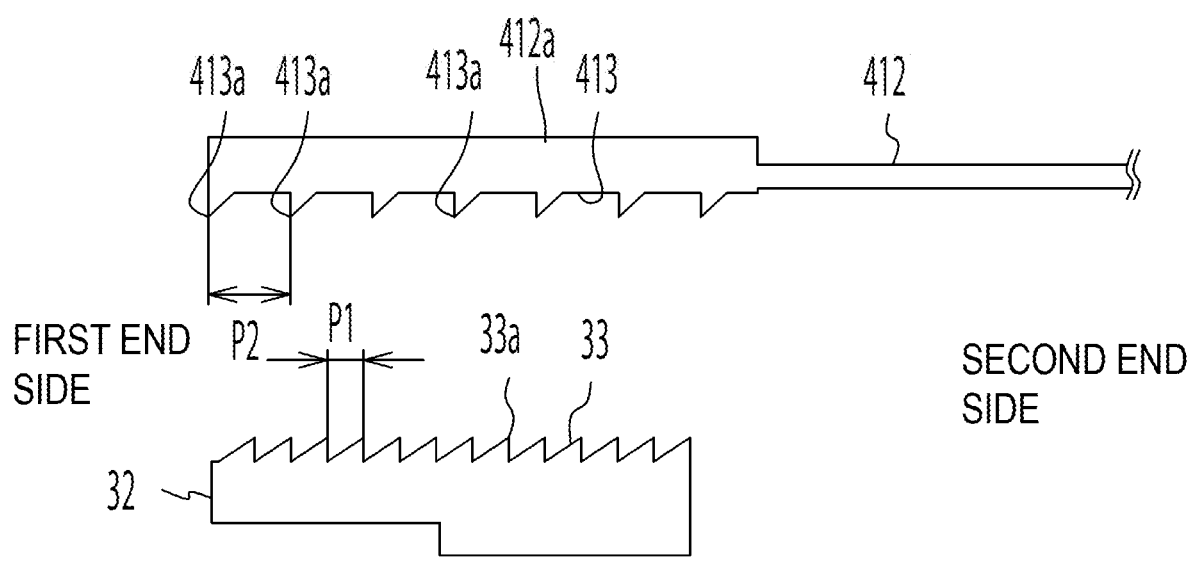
FIG. 12 is an explanatory view illustrating an engaging portion and an engaged portion of a fourth embodiment.

Next, a fourth embodiment will be described with reference to FIG. 12. FIG. 12 is an explanatory view illustrating an engaging portion and an engaged portion of the fourth embodiment.

A second housing 412 in the fourth embodiment is manufactured through die casting. A second housing 412 is provided with an engaging portion 413 on a top plate portion 412a. The engaging portion 413 is provided with engaging protrusions 413a. In the same manner as the first embodiment, the engaging protrusions 413a are engaged with the engaged protrusions 33a included in the engaged portion 33 provided in the second member 32. Here, the interval P2 of the engaging protrusions 413a is an integral multiple of the interval P1 of the engaged protrusions 33a (twice in the present embodiment).

The narrower the interval of the engaging protrusions, the maximum amount of movement of the connector assembly may be reduced. However, in the die casting, there is concern that the reproducibility of the engaging protrusions provided at a micro interval may deteriorate. Therefore, when the engaging protrusions are thinned out and the interval of the engaging protrusions 413 is enlarged, it is possible to form the engaging protrusions 413a with a predetermined accuracy even when the second housing is manufactured through the die casting. At this time, when the interval P2 of the engaging protrusions 413a is set to an integral multiple of the interval P1 of the engaged protrusions 33a, the engaging protrusions 413a and the engaged protrusions 33a may be properly engaged with each other.

Fifth Embodiment

Figure 13A:
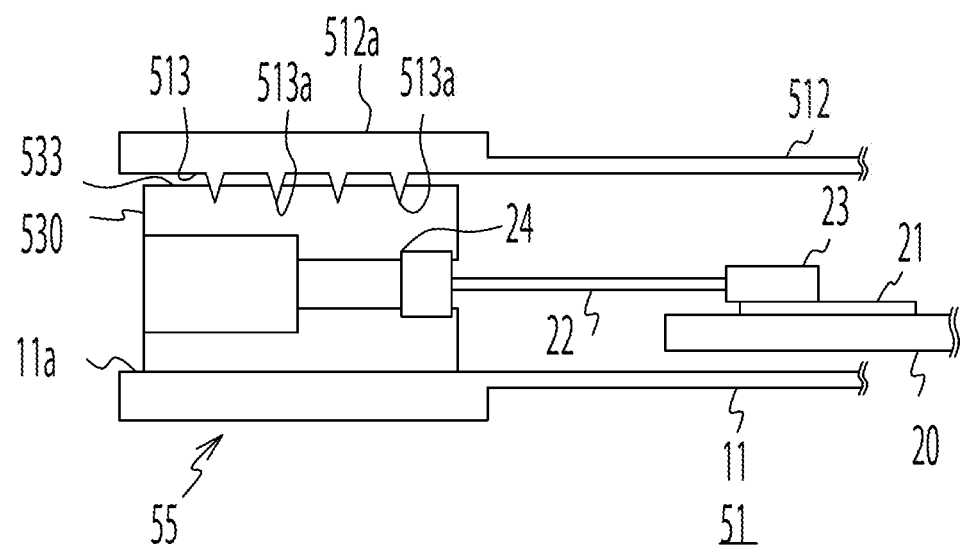
FIG. 13A is an explanatory view illustrating the inside of an optical transceiver of a fifth embodiment.
Figure 13B:
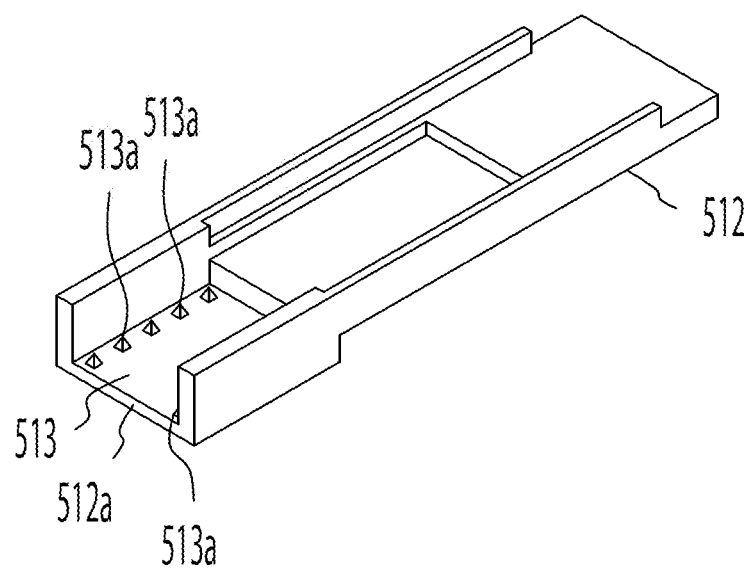
FIG. 13B is a perspective view of a second housing of the fifth embodiment.

Next, a fifth embodiment will be described with reference to FIGS. 13A and 13B. FIG. 13A is an explanatory view illustrating the inside of an optical transceiver of the fifth embodiment, and FIG. 13B is a perspective view of the second housing of the fifth embodiment. Components which are common to the first embodiment are denoted by the same reference numerals in the drawings, and a detailed description thereof will be omitted.

An optical transceiver 51 and an optical connector 55 of the present embodiment are different from those of the first embodiment in terms of a second housing and a connector assembly. The second housing 512 of the present embodiment is provided with engaging portions 513 on a top plate portion 512a. The engaging portion 513 is provided with engaging protrusions 513a. The engaging protrusions 513a are needle-shaped protrusions which pierces the surface of the engaged portion 533 of a connector assembly 530. The engaging protrusions 513a bite into the surface of the engaged portion 533 of the connector assembly when the second housing 512 and the first housing 11 are screwed and bonded to each other.

In this manner, the engaging protrusions 513a fix the connector assembly 530 by being pierced to the engaged portion 533 of the connector assembly 530. Therefore, unlike the other embodiments, the engaged portions 533 of the connector assembly 530 is not provided with an engaged protrusion, but is a smooth surface.

As in the present embodiment, when the connector assembly 530 is fixed by piercing the engaging protrusions 513 to the engaged portion 533 of the connector assembly 530, the connector assembly 530 does not move with fixation. That is, also in the present embodiment, when manufacturing the optical transceiver 51, the connector assembly 530 is positioned according to the natural length of the inner optical fiber 22. Then, when mounting the second housing 512, since the engaging protrusions 513a are pierced to the engaged portion 533 of the connector assembly 530, the connector assembly 530 is not moved.

As described above, according to the present embodiment, it is possible to fix the connector assembly 530 to a position according to the natural length of the inner optical fiber 22 without being affected by the interval of the engaging protrusions 513a.

Figure 14:
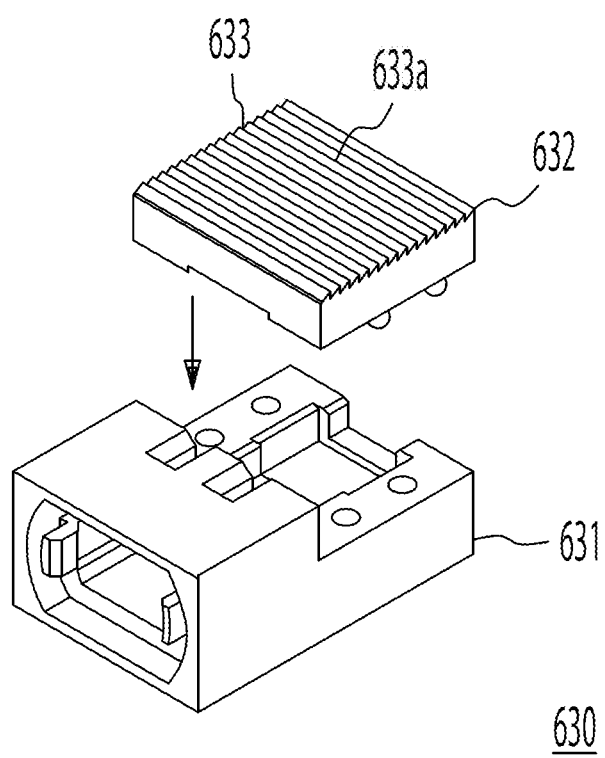
FIG. 14 is an exploded perspective view of a connector assembly of a modified example.

As illustrated in FIG. 14, a connector assembly 630 may take a separation aspect that is different from that of the first embodiment. That is, only the portion corresponding to the position where the MT ferrule 24 of the first member 631 may be used as a second member 632. With this configuration, the MT ferrule 24 may also be easily fixed. Further, in the example illustrated in FIG. 14, an engaged portion 633 is formed which is provided with engaged protrusions 633a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
   a circuit board, having an electronic circuit formed therein and an optical circuit mounted thereon, coupled to a first end of an inner optical fiber;
   a connector assembly to which a second end of the inner optical fiber is fixed; and
   a housing including a first housing including a slid surface on which a sliding surface included in the connector assembly slides so as to position the connector assembly and a second housing including a plurality of first engaging protrusions along a sliding direction of the connector assembly, each of the plurality of first engaging protrusions extending in the direction orthogonal to the sliding direction of the connector assembly, being aligned to the sliding direction, and being engaged with the positioned connector assembly so as to fix the connector assembly, the second housing being bonded to the first housing and the housing being mounted with the circuit board.

2. The optical module according to claim 1, wherein
   each of the plurality of first engaging protrusions is configured to have a triangle shape including an inclined surface on a side corresponding to a first end side of the housing; and
   the connector assembly is configured to include a plurality of second engaging protrusions, each of the plurality of second engaging protrusions has a triangle shape including an inclined surface to be in contact with the inclined surface included in each of the plurality of first engaging protrusions.

3. The optical module according to claim 2, wherein
   the plurality of first engaging protrusions of the second housing and the plurality of second engaging protrusions of the connector assembly are configured to be provided from a first end side of the housing toward a second end side, and
   an interval of the plurality of first engaging protrusions is set as a distance which is an integral multiple of an interval of the plurality of second engaging protrusions.

4. The optical module according to claim 1, wherein the plurality of first engaging protrusions of the second housing are configured to be needle-shape protrusions pierced to a surface of the connector assembly.

5. The optical module according to claim 1, wherein the plurality of first engaging protrusions are configured to be separate from a top plate included in the second housing.

6. The optical module according to claim 1, wherein the slid surface is configured to be formed on a surface of a rail which is provided in the first housing.

7. The optical module according to claim 1, wherein the sliding surface is configured to be formed on a surface of a rail which is provided in the connector assembly.

8. A method of manufacturing an optical module, the method comprising:
   positioning a connector assembly with respect to a first housing by: mounting a circuit board mounted with an optical circuit coupled to a first end of an inner optical fiber on a circuit board mounting area of the first housing that includes a slid surface on a first end side and the circuit board mounting area on a second end side;
   placing the connector assembly, to which a second end of the inner optical fiber is fixed, on the slid surface of the first housing;
   bringing a sliding surface included in the connector assembly into contact with the slid surface of the first housing; and
   bonding the first housing and the second housing in a state in which a plurality of first engaging protrusions along sliding direction of the connector assembly included in the second housing bonded with the first housing is engaged with the connector assembly to fix the connector assembly, each of the plurality of first engaging protrusions, being aligned to the sliding direction, extending in the direction orthogonal to the sliding direction of the connector assembly.

* * * * *